(12) United States Patent
Shigematsu et al.

(10) Patent No.: US 9,712,026 B2
(45) Date of Patent: Jul. 18, 2017

(54) CONDUCTIVE WIRE PIECE SET FORMING METHOD AND CONDUCTIVE WIRE PIECE SET FORMING DEVICE

(71) Applicant: HONDA MOTOR CO., LTD., Tokyo (JP)

(72) Inventors: Hideki Shigematsu, Tochigi (JP); Takahiro Ide, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 14/468,639

(22) Filed: Aug. 26, 2014

(65) Prior Publication Data

US 2015/0059174 A1    Mar. 5, 2015

(30) Foreign Application Priority Data

Aug. 27, 2013  (JP) .................................. 2013-176019

(51) Int. Cl.
*H01R 43/00* (2006.01)
*H02K 15/04* (2006.01)

(52) U.S. Cl.
CPC .... *H02K 15/0428* (2013.01); *Y10T 29/49201* (2015.01); *Y10T 29/53243* (2015.01)

(58) Field of Classification Search
CPC ........... H02K 15/0428; H02K 15/0442; H02K 15/045; H02K 15/0471; H02K 15/0478; Y10T 29/53243; Y10T 29/49201
USPC ...................................... 29/872, 755
See application file for complete search history.

(56) References Cited

U.S. PATENT DOCUMENTS

| 2009/0276997 A1* | 11/2009 | Akimoto ................... H02K 3/28 29/596 |
| 2012/0200190 A1* | 8/2012 | Matsuoka ................ H02K 3/12 310/179 |

* cited by examiner

*Primary Examiner* — Peter DungBa Vo
*Assistant Examiner* — Azm Parvez
(74) *Attorney, Agent, or Firm* — Rankin, Hill & Clark LLP

(57) ABSTRACT

A conductive wire piece set forming method includes: a bending step of bending a conductive wire piece set in a second bent portion; a restraining step of restraining the second bent portion of the conductive wire piece set and a portion adjacent thereto with a clamp portion; and a twisting step of twisting the conductive wire piece set by rotating the clamp portion. The restraint of the conductive wire piece set is performed in such a way that the conductive wire pieces form a predetermined angle with each other.

5 Claims, 5 Drawing Sheets

CONDUCTIVE WIRE PIECE SET FORMING METHOD AND CONDUCTIVE WIRE PIECE SET FORMING DEVICE

BACKGROUND OF THE INVENTION

Field of the Invention

The present invention relates to a conductive wire piece set forming method and a conductive wire piece set forming device for forming a conductive wire piece set including a predetermined number of conductive wire pieces superposed on each other.

Description of the Related Art

Conventionally, it is known that a stator coil for a rotating electrical machine is constructed of many conductive wire pieces. In this construction, the many conductive wire pieces formed in an almost U shape are annularly aligned with U-shaped central portions thereof superposed and the conductive wire pieces are inserted into slots of a stator core from both end sides of the U shape. Thereby, the ends of the respective conductive wire pieces project from the slots. Then, the projecting ends of the conductive wire pieces are joined to each other, by which a stator coil is made (for example, refer to Patent Document 1).

Moreover, it is also known that a stator coil is constructed of conductive wire piece sets, each of which includes a predetermined number of conductive wire pieces superposed on each other in a thickness direction, where each conductive wire piece has a rectangular cross section and has a predetermined length, width, and thickness (refer to Patent Document 2). These conductive wire piece sets are formed in the almost U shape for each conductive wire piece set.

A plurality of formed conductive wire piece sets are annularly arranged so as to be partially superposed and inserted into slots of a stator core from both end sides. Furthermore, the end sides of the conductive wire piece sets projecting from the slots are folded and the ends corresponding to each other are joined together, by which the stator coil is made.

CITATION LIST

Patent Documents

[Patent Document 1] Japanese Patent No. 3894004
[Patent Document 2] Japanese Patent Application Laid-Open No. 2012-165624

In the case of forming the conductive wire piece set in the above Patent Document 2 into the almost U shape, for example, the central portion of the conductive wire piece set is bent in the thickness direction and further the vicinity of the bent portion is bent in the reverse direction. In addition, the both leg portions of the U shape are shaped by folding both end sides of the conductive wire piece set in the width direction of the conductive wire pieces. In the shaping, the both leg portions are made parallel to each other by twisting a portion adjacent to the above portion bent in the reverse direction on the central portion side.

In the case of forming the conductive wire piece set in the almost U shape in this manner, however, considerable variation is observed in the width direction of the conductive wire pieces in the positions of the end faces on the side where the above twisting is performed in the conductive wire pieces of the formed conductive wire piece set. Due to the variation in the end face positions, a trouble occurs when inserting the formed conductive wire piece set into a slot of the stator core. Moreover, the ends of the conductive wire pieces projecting from the slot are not aligned, thereby also causing a trouble in joining the ends of the conductive wire pieces.

It is therefore an object of the present invention to provide a conductive wire piece set forming method and a conductive wire piece set forming device capable of forming a conductive wire piece set so as to achieve the end faces of the conductive wire pieces of the conductive wire piece set that are aligned as much as possible in the positions in the width direction.

SUMMARY OF THE INVENTION

According to an aspect of the present invention, there is provided a conductive wire piece set forming method for forming a conductive wire piece set including a predetermined number of conductive wire pieces superposed on each other in a thickness direction, each conductive wire piece having a rectangular cross section and having a predetermined length, width, and thickness, the method comprising: a bending step of bending the conductive wire piece set in a predetermined bent portion so that the center of curvature is located in a direction of superposing the conductive wire pieces of the conductive wire piece set; a fixing step of fixing a portion which is adjacent to one side of the bent portion of the conductive wire piece set bent in the bending step; a restraining step of restraining a portion which is adjacent to the other side of the bent portion of the conductive wire piece set bent in the bending step and the bent portion using a restraint tool; and a twisting step of twisting the conductive wire piece set by rotating the restraint tool about a center axis line in a length direction in the portion which is adjacent to the one side of the bent portion of the conductive wire piece set, after the fixing step and the restraining step, wherein the restraint of the conductive wire piece set with the restraint tool is performed in such a way that the respective conductive wire pieces form a predetermined angle with each other so as to reduce variation in a position in a width direction with respect to ends on the other side of the bent portion in the respective conductive wire pieces of the conductive wire piece set after the twisting step.

If the above bending step, fixing step, restraining step, and twisting step are performed without putting any contraption into the restraint tool, considerable variation is observed in the width direction with respect to the aforementioned positions of the ends on the other side in the respective conductive wire pieces of the conductive wire piece set after the twisting step. The present inventors, et al. clarified that the variation is caused by a difference between the respective conductive wire pieces of the conductive wire piece set in the springback effect which occurs in the conductive wire piece set after the twisting step.

Therefore, taking into consideration the difference in the springback effect in the present invention, the restraint of the conductive wire piece set with the restrain tool may be performed in such a way that the conductive wire pieces of the conductive wire piece set form a predetermined angle with each other. For example, in the case where the conductive wire piece set is composed of four conductive wire pieces, the conductive wire piece set is restrained with the restraint tool so that the two inner conductive wire pieces form an angle of 2° with the two outer conductive wire pieces in the twisting direction.

Specifically, in response to the difference in the springback effect, a difference is previously provided in the twisting amounts of the conductive wire pieces in the restraining step to offset the difference. This enables the positions in the width direction of the end portions of the conductive wire pieces of the conductive wire piece set to coincide with each other as much as possible after the twisting step, in spite of the difference in the springback effect.

In the present invention, after the twisting step, the respective conductive wire pieces of the conductive wire piece set may be bent back due to the springback effect in a direction that the ends on the other side are aligned in the positions in the width direction. According thereto, the positions in the width direction of the ends can be made to coincide with each other by offsetting the difference in the positions in the width direction among the ends of the conductive wire pieces of the conductive wire piece set immediately after the twisting step due to the springback effect.

In the present invention, the restraint tool may be provided with a restraining surface for restraining the conductive wire pieces with the angle formed therebetween so that the restraint of the conductive wire piece set is performed in such a way that the conductive wire pieces form the angle with each other. According thereto, the conductive wire piece set can be restrained in such a way that the conductive wire pieces form a predetermined angle with each other by using a restraint tool having a simple configuration.

According to another aspect of the present invention, there is provided a conductive wire piece set forming device which forms a conductive wire piece set including a predetermined number of conductive wire pieces superposed on each other in a thickness direction, each conductive wire piece having a rectangular cross section and having a predetermined length, width, and thickness, the device comprising: a fixing jig for fixing a portion which is adjacent to one side of a predetermined bent portion of the conductive wire piece set bent in the bent portion so that a center of curvature is located in a direction of superposing the conductive wire pieces; a restraint tool for restraining a portion which is adjacent to the other side of the bent portion of the conductive wire piece set bent in the bent portion and the bent portion; and a rotary drive unit for twisting the conductive wire piece set by rotating the restraint tool about a center axis line in the length direction in the portion which is adjacent to the one side of the bent portion of the conductive wire piece set restrained by the restraint tool, wherein the restraint tool restrains the conductive wire piece set so that the conductive wire pieces form a predetermined angle so as to reduce variation in a position in a width direction of ends of the conductive wire pieces of the conductive wire piece set after the twisting with the rotary drive unit.

According to the present invention, similarly to the aforementioned conductive wire piece set forming method, the positions in the width direction of the ends of the conductive wire pieces of the conductive wire piece set after the twisting can be made to coincide with each other as much as possible, in spite of the difference in the springback effect in the conductive wire pieces of the conductive wire piece set.

BRIEF DESCRIPTION OF THE DRAWINGS

FIG. 1A illustrates a state where the conductive wire piece set is positioned; FIG. 1B illustrates a state where the conductive wire piece set is bent in a first bent portion; FIG. 1C illustrates a state where the conductive wire piece set is bent in a second bent position; FIG. 1D illustrates a state where the intermediate portion of the conductive wire piece set is fixed; FIG. 1E illustrates a state where both outer sides of the intermediate portion of the conductive wire piece set are folded downwardly; and FIGS. 1F and 1G illustrate states where a fixing step, a restraining step, and a twisting step are performed;

FIG. 3A illustrates the upper plate viewed from the lower plate side; and FIG. 3B illustrates the lower plate viewed from the upper plate side;

FIG. 5A illustrates a state of the ends of the conductive wire pieces of the conductive wire piece set formed according to the embodiment viewed from an end face side; and FIG. 5B illustrates a state of the ends of the conductive wire pieces of a conductive wire piece set formed according to a comparative example viewed from the end face side.

DESCRIPTION OF THE PREFERRED EMBODIMENTS

Figure 1A:
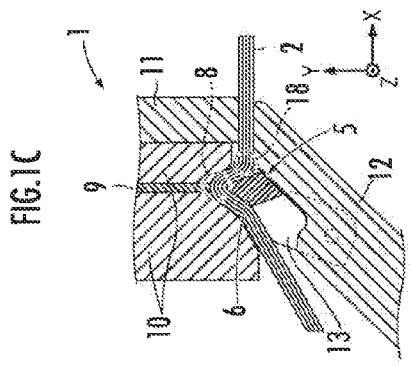
FIGS. 1A to 1G are diagrams illustrating a process of forming a conductive wire piece set by using a conductive wire piece set forming device according to one embodiment of the present invention.
Figure 1B:
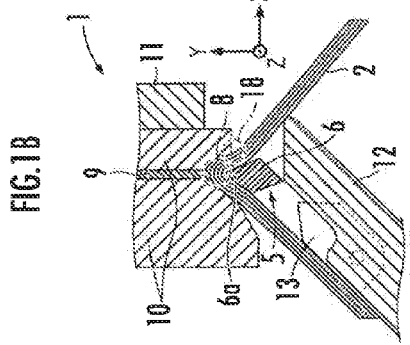
Figure 1C:
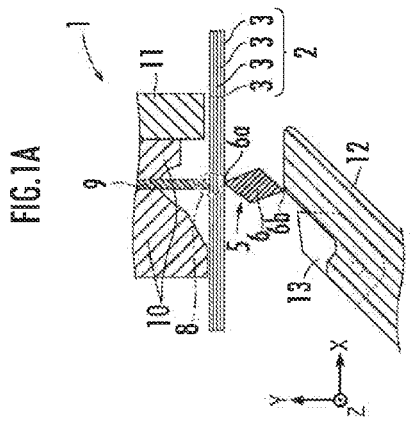
Figure 1D:
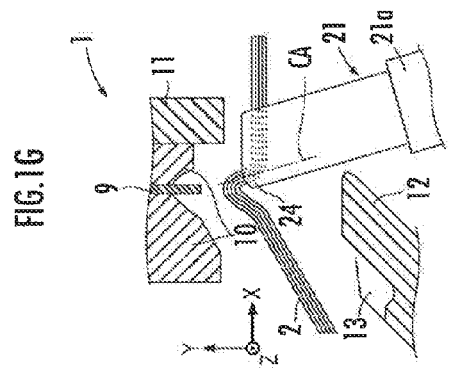

Hereinafter, the embodiment of the present invention will be described by using appended drawings. As illustrated in FIGS. 1A and 1G, a conductive wire piece set forming device 1 according to the embodiment forms a supplied conductive wire piece set 2 in an almost U shape as illustrated in FIG. 2 in a procedure illustrated in FIGS. 1A to 1G The conductive wire piece set 2 includes four conductive wire pieces 3 superposed on each other in the thickness direction, where each conductive wire piece 3 has a rectangular cross section and has a predetermined length, width, and thickness. When the XYZ axes are defined as illustrated in FIGS. 1A to 1G, the supply of the conductive wire piece set 2 is performed in the positive direction of the X axis with a posture in which the width direction of the conductive wire piece 3 is parallel to the Z axis and the length direction is parallel to the X axis.

In FIGS. 1A to 1C and 1G, a cross section perpendicular to the Z axis is illustrated. Additionally, in FIGS. 1D to 1F, a cross section perpendicular to the Y axis is illustrated. Furthermore, the positive direction of the Z axis coincides with a vertically upward direction. Moreover, in FIGS. 1A to 1G, only the cross sections of the main dies and a sixth die 13 and an 11th die 21 described later are illustrated as the main components of the conductive wire piece set forming device 1.

As illustrated in FIGS. 1A to 1G, the conductive wire piece set forming device 1 includes a first die 5 which is to be a core metal in forming the conductive wire piece set 2. The first die 5 includes a rhombic portion 6 whose cross section parallel to the XY plane has an almost rhombic shape and which is movable in the Z-axis direction and a trapezoid portion 7 whose cross section parallel to the ZX plane has a trapezoidal shape.

As illustrated in FIG. 1A, the rhombic portion 6 has an acute-angle portion 6a, which forms one acute angle in the rhombic shape of the cross section, facing to a first bent portion 8 substantially in the center of the conductive wire piece set 2. An acute-angle portion 6*b*, which forms the other acute angle, faces to the side opposite to the conductive wire piece set 2. As illustrated in FIG. 1B, the rhombic portion 6 is used to bend the conductive wire piece set 2 in the first bent portion 8 by using the acute-angle portion 6*a*.

Figure 1E:
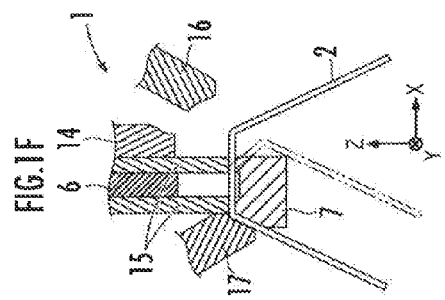
Figure 2:
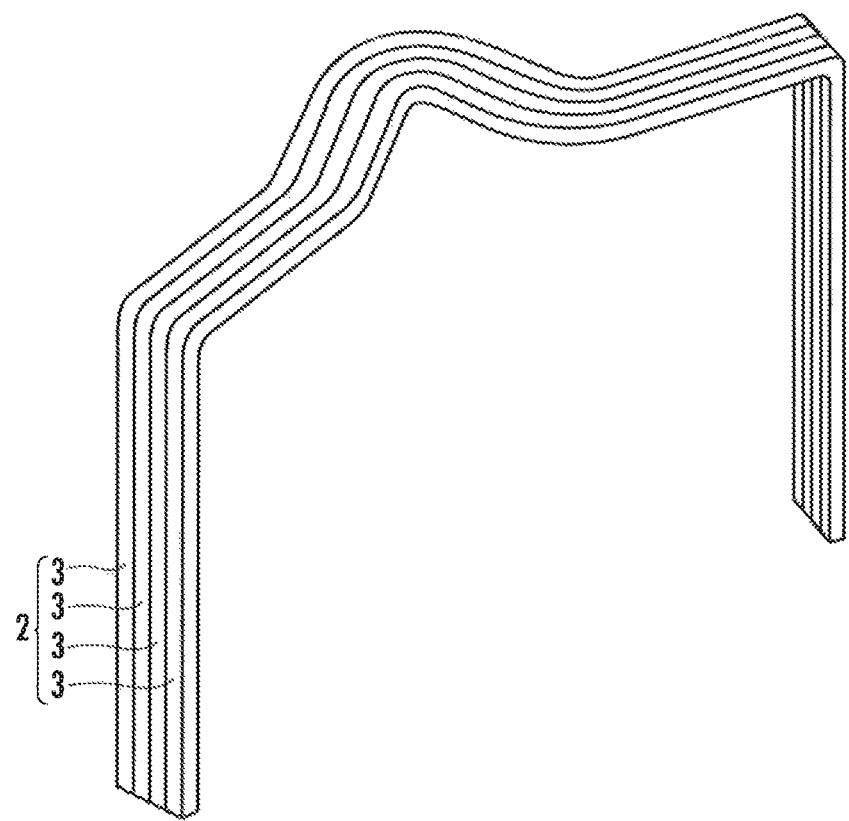
FIG. 2 is a perspective view illustrating a conductive wire piece set formed in the procedure of FIGS. 1A to 1G.

As illustrated in FIG. 1E, the trapezoid portion 7 is used to bend both sides of the central portion of the conductive wire piece set 2 downwardly (in the width direction of the conductive wire pieces 3). A part 7*a* on the positive X-axis direction side of the trapezoid portion 7 is able to be retracted in the negative direction of the Y axis when the conductive wire piece set 2 is twisted as described later.

The conductive wire piece set forming device 1 is provided with a second die 9 for use in fixing the first bent portion 8 of the supplied conductive wire piece set 2 by sandwiching the first bent portion 8 between the rhombic portion 6 of the first die 5 and the second die 9. The second die 9 is movable in the Y-axis direction.

Moreover, the conductive wire piece set forming device 1 includes a third die 10, a fourth die 11, a fifth die 12, and a sixth die 13 for forming the conductive wire piece set 2 in a direction substantially parallel to the XY plane and a seventh die 14, an eighth die 15, a ninth die 16, and a 10th die 17 for forming the conductive wire piece set 2 in a direction substantially parallel to the XZ plane.

The third die 10 has a forming surface for forming the first bent portion 8 of the conductive wire piece set 2 and both sides thereof and is movable in the Y-axis direction. The third die 10 and the rhombic portion 6 of the first die 5 are able to fold the conductive wire piece set 2 in the first bent portion 8 thereof toward the rhombic portion 6 side in cooperation with each other.

The fourth die 11 is movable in the Y-axis direction along the third die 10 on the positive X-axis direction side of the third die 10. The fourth die 11 is provided with a forming surface parallel to the XZ plane. The fifth die 12 is movable in a direction which is parallel to the XY plane and forms an angle of substantially 45° relative to the X axis, along one side surface of the rhombic portion 6. As illustrated in FIG. 1C, the fifth die 12 has a forming surface facing to a portion on the fourth die 11 side of the forming surface of the third die 10 and to the forming surface of the fourth die 11 in the advance position.

The portion on the fourth die 11 side of the forming surface of the third die 10 and the portion of the forming surface of the fifth die 12 facing thereto are used to bend the conductive wire piece set 2, which has been bent in the first bent portion 8, in the second bent portion 18 in the reverse direction. The forming surface of the fourth die 11 and the portion of the forming surface of the fifth die 12 facing thereto are used to marginally bend back the conductive wire piece set 2 which has been bent in the reverse direction.

The sixth die 13 is supported by the fifth die 12 so as to be able to turn within the plane parallel to the XY plane. The sixth die 13 is provided with a forming surface appropriate for slightly bending back the conductive wire piece set 2 bent in the first bent portion 8 on the opposite side of the second bent portion 18 of the first bent portion 8. This bending back is performed in cooperation with the corresponding portion of the forming surface of the third die 10.

When the fifth die 12 is advanced, the sixth die 13 rotates by the sliding of an end on the opposite side of an end where the rotation shaft is provided on a side surface of the rhombic portion 6 different from a side surface thereof on which the fifth die 12 slides. This causes the forming surface of the sixth die 13 to be adjacent to the forming surface of the rhombic portion 6 so as to be used for the above bending back performed in cooperation with the third die 10.

The seventh die 14 and the eighth die 15 are movable in the Z-axis direction. As illustrated in FIG. 1D, the seventh die 14 and the eighth die 15 are used to fix the conductive wire piece set 2 to the top surface of the trapezoid portion 7 of the first die 5 by pushing the conductive wire piece set 2 from the positive direction of the Z axis (from above).

The ninth die 16 is movable, in the advance position, in a direction inclined with respect to the Z axis within a plane parallel to the XZ plane so that the forming surface of the ninth die 16 is able to be opposed to the forming surface composed of a side surface of the trapezoid portion 7 on the positive X-axis direction side. As illustrated in FIG. 1E, the ninth die 16 is used to fold the conductive wire piece set 2 downwardly in the downward bent portion 19, which is separated from the second bent portion 18 of the conductive wire piece set 2 by a predetermined distance in the positive direction of the X axis.

The 10th die 17 is movable, in the advance position, in a direction inclined with respect to the Z axis within a plane parallel to the XZ plane so that the forming surface of the 10th die 17 is able to be opposed to the forming surface composed of a side surface of the trapezoid portion 7 on the negative X-axis direction side. As illustrated in FIG. 1E, the 10th die 17 is used to fold the conductive wire piece set 2 downwardly in the downward bent portion 20, which is separated from the first bent portion 8 of the conductive wire piece set 2 by a predetermined distance in the negative direction of the X axis.

Figure 3A:
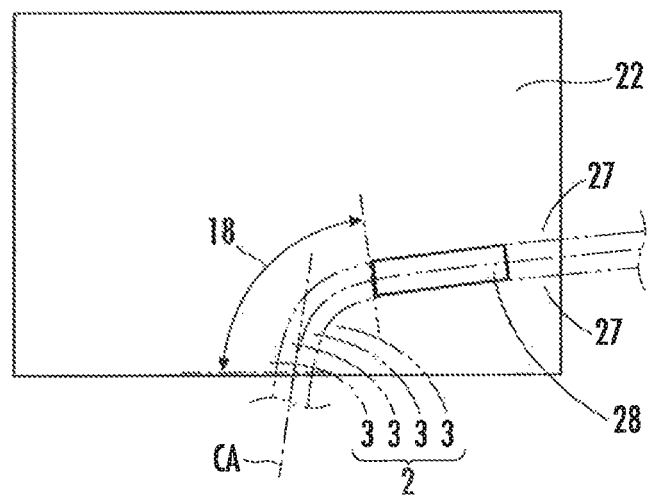
FIGS. 3A and 3B are diagrams illustrating an upper plate and a lower plate constituting a clamp portion of the conductive wire piece set forming device.
Figure 3B:
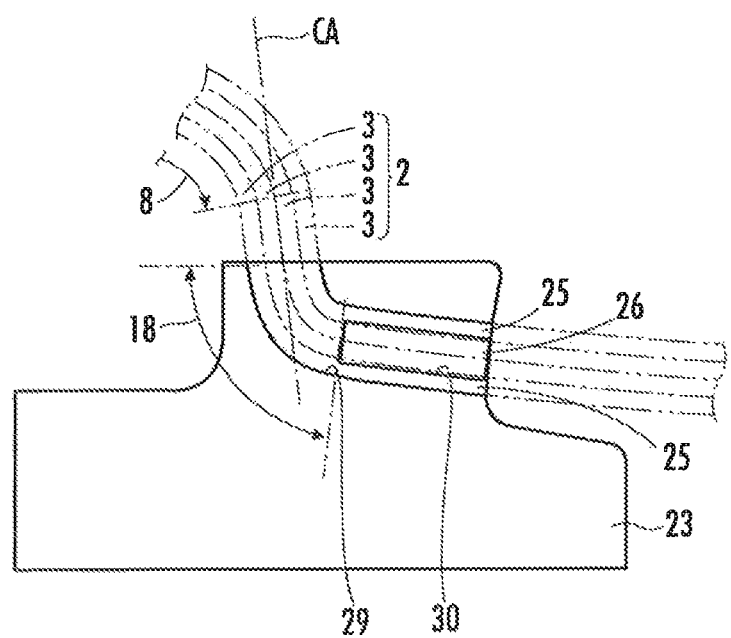

Moreover, the conductive wire piece set forming device 1 includes an 11th die 21 for use in twisting the conductive wire piece set 2 as illustrated in FIG. 1G. The 11th die 21 has a clamp portion 24 at a tip portion, as a restraint tool including an upper plate 22 as illustrated in FIG. 3A and a lower plate 23 as illustrated in FIG. 3B.

The clamp portion 24 is able to restrain the conductive wire piece set 2 by sandwiching the conductive wire piece set 2 between the upper plate 22 and the lower plate 23. The clamp portion 24 restrains the bent second bent portion 18 of the conductive wire piece set 2 and a portion adjacent to the second bent portion 18 on the opposite side of the first bent portion 8.

Moreover, the 11th die 21 is provided with a rotary drive unit 21*a* for use in rotating the clamp portion 24 about a center axis line CA in the length direction in s portion adjacent to the second bent portion 18 of the conductive wire piece set 2 on the first bent portion 8 side (See FIG. 1G). The conductive wire piece set 2 is able to be twisted by rotating the clamp portion 24 restraining the conductive wire piece set 2 with the rotary drive unit 21*a*.

The lower plate 23 includes a lower-side first restraining surface 25 for restraining two outer conductive wire pieces 3 of the conductive wire piece set 2 by sandwiching them and a lower-side second restraining surface 26 for restraining two inner conductive wire pieces 3 by sandwiching them. The upper plate 22 includes an upper-side first restraining surface 27 for restraining the two outer conductive wire pieces 3 by sandwiching them and an upper-side second restraining surface 28 for restraining the two inner conductive wire pieces 3 by sandwiching them.

The lower-side first restraining surface 25 and the upper-side first restraining surface 27 are parallel to each other. Moreover, the lower-side second restraining surface 26 and the upper-side second restraining surface 28 are parallel to each other. The lower-side first restraining surface 25 is composed of the bottom of a first groove 29 shaped in the plate surface of the lower plate 23. The side surface of the first groove 29 restrains the outer surfaces of the two outer conductive wire pieces 3, too.

The lower-side second restraining surface 26 is composed of the bottom of a second groove 30 shaped in the bottom of the first groove 29. The side surface of the second groove 30 restrains the outer surfaces of the two inner conductive wire pieces 3, too. The upper-side second restraining surface 28 is shaped by a projection provided on the upper-side first restraining surface 27.

The lower-side second restraining surface 26 and the upper-side second restraining surface 28 are inclined at a predetermined angle such as, for example, 2° with respect to the lower-side first restraining surface 25 and the upper-side first restraining surface 27 in a direction of twisting the conductive wire piece set 2. Therefore, the depth of the second groove 30 relative to the bottom of the first groove 29 increases as the position is away from the twisted portion between the first bent portion 8 and the second bent portion 18. Corresponding to this, the height of the upper-side second restraining surface 28 from the upper-side first restraining surface 27 increases as the position is away from the twisted portion.

Figure 4:
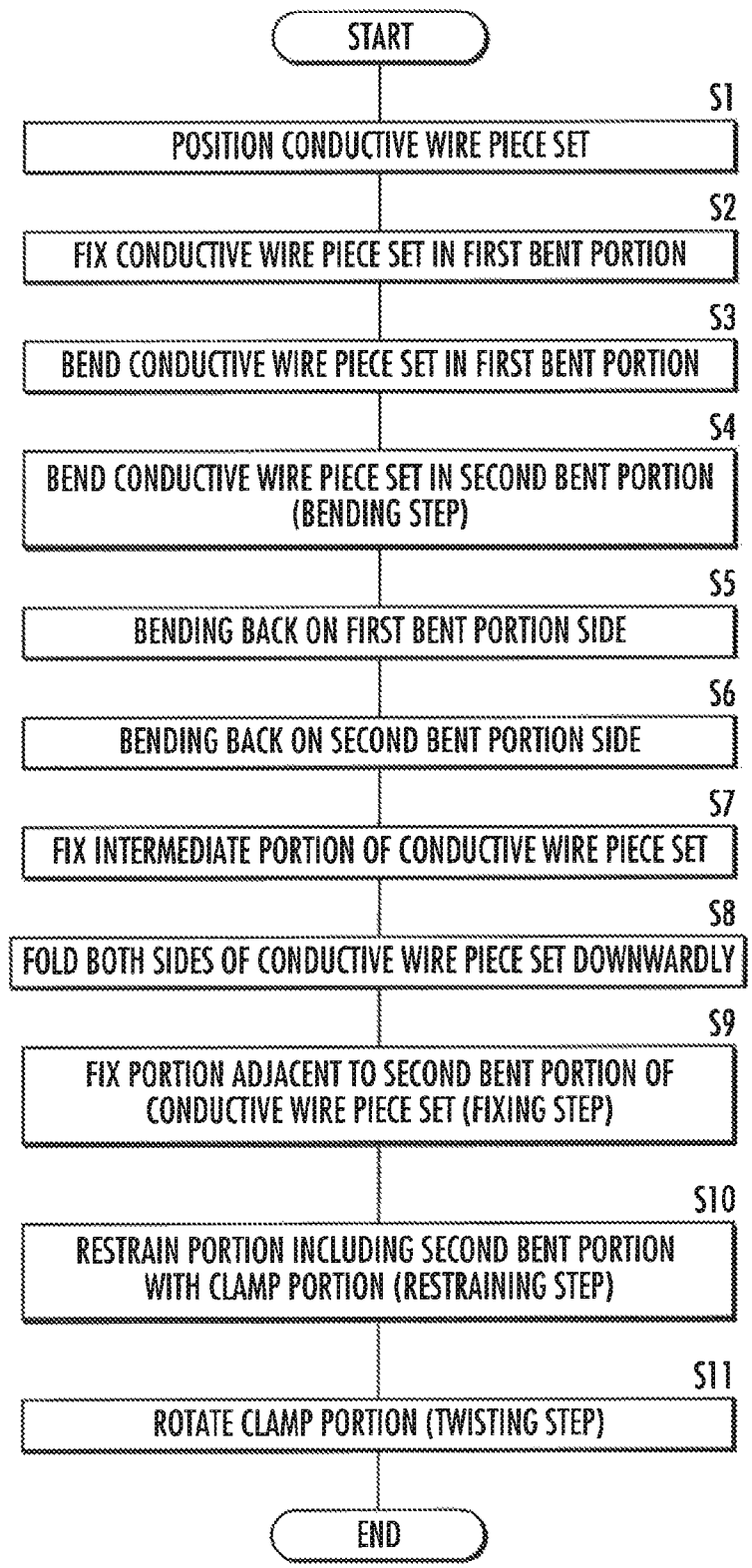
FIG. 4 is a flowchart illustrating an operation of the conductive wire piece set forming device for forming a conductive wire piece set.

FIG. 4 is a flowchart illustrating an operation of the conductive wire piece set forming device 1 in forming a conductive wire piece set 2. When forming the conductive wire piece set 2, the conductive wire piece set forming device 1, first, positions the conductive wire piece set 2 as illustrated in FIG. 4 (step S1). Specifically, as illustrated in FIG. 1A, the conductive wire piece set 2 is positioned so that the first bent portion 8 thereof is located at a predetermined position with a posture in which the length direction of each conductive wire piece 3 coincides with the X-axis direction, the width direction coincides with the Z-axis direction, and the thickness direction coincides with the Y-axis direction.

Subsequently, the rhombic portion 6 of the first die 5 is moved down and the second die 9 is advanced. This causes the conductive wire piece set 2 to be sandwiched and fixed between the rhombic portion 6 and the second die 9 in the first bent portion 8 (step S2). Then, as illustrated in FIG. 1B, the third die 10 is advanced. This causes the conductive wire piece set 2 to be pressed between the third die 10 and the rhombic portion 6 so as to be bent in the first bent portion 8 (step S3).

Subsequently, a bending step is performed to bend the conductive wire piece set 2 in the second bent portion 18 so that the center of curvature is located in the direction of superposing the conductive wire pieces 3 of the conductive wire piece set 2 (step S4). Specifically, as illustrated in FIG. 1C, the fifth die 12 is advanced. This causes the conductive wire piece set 2 to be pressed between the fifth die 12 and the fourth die 11. Thereby, the conductive wire piece set 2 is bent reversely to the first bent portion 8 in the second bent portion 18.

In addition, at the time of this bending, the sixth die 13 rotates by the advance of the fifth die 12, by which the forming surface of the sixth die 13 faces to the corresponding portion of the forming surface of the third die 10. Due to this, the conductive wire piece set 2 bent in the first bent portion 8 is slightly bent back in the position on the opposite side of the second bent portion 18 (step S5).

Furthermore, the fourth die 11 is advanced. This causes the conductive wire piece set 2 to be pressed between the fourth die 11 and the fifth die 12. Therefore, the conductive wire piece set 2 is slightly bent back reversely to the bending direction in the second bent portion 18 (step S6).

Subsequently, as illustrated in FIG. 1D, the seventh die 14 and the eighth die 15 are moved down. This causes the conductive wire piece set 2 to be sandwiched and fixed, in the intermediate portion including the first bent portion 8 and the second bent portion 18, between the seventh and eighth dies 14 and 15 and the top surface of the trapezoid portion 7 of the first die 5 in the width direction of the conductive wire pieces 3 (step S7). Then, as illustrated in FIG. 1E, the ninth die 16 and the 10th die 17 are moved down. By doing so, both outer sides of the intermediate portion of the conductive wire piece set 2 are downwardly folded (step S8).

Figure 1F:
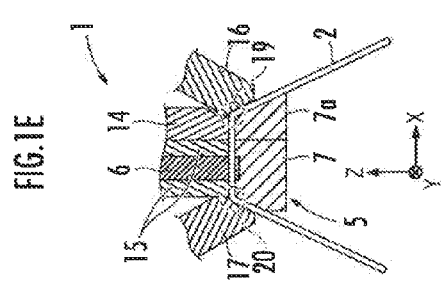
Figure 1G:
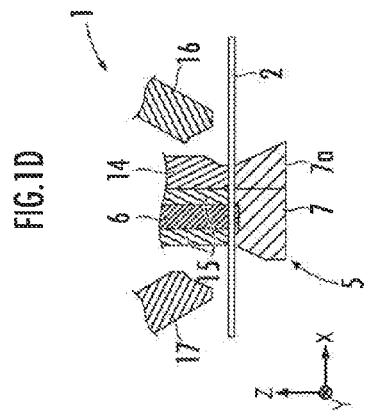

Subsequently, a fixing step is performed to fix a portion of the conductive wire piece set 2 adjacent to the second bent portion 18 on the first bent portion 8 side (step S9). Specifically, as illustrated in FIGS. 1F and 1G, the ninth die 16, the seventh die 14, the rhombic portion 6 of the first die 5, the third die 10, the fourth die 11, and the fifth die 12 are brought back. Additionally, the part 7a of the trapezoid portion 7 of the first die 5 is retracted.

This causes the conductive wire piece set 2 to be sandwiched between a portion other than the part 7a of the trapezoid portion 7 as a fixing jig and the eighth and 10th dies 15 and 17. Specifically, the conductive wire piece set 2 is fixed in the portion adjacent to the second bent portion 18 on the first bent portion 8 side.

Subsequently, a restraining step is performed to restrain a portion adjacent to the second bent portion 18 of the conductive wire piece set 2 on the opposite side of the first bent portion 8 and the second bent portion 18 using the clamp portion 24 (step S10). Specifically, the 11th die 21 is advanced, by which the conductive wire piece set 2 is retrained by the clamp portion 24 of the 11th die 21.

Thereafter, a twisting step is performed to twist the conductive wire piece set 2 by rotating the clamp portion 24 about the center axis line CA in the length direction in the portion adjacent to the second bent portion 18 of the conductive wire piece set 2 on the first bent portion 8 side (step S11).

This causes the leg portions on both sides of the conductive wire piece set 2 to be substantially parallel to each other as illustrated in FIG. 1F, by which the forming of the conductive wire piece set 2 is completed. The conductive wire piece set 2 completed to be formed is removed from the conductive wire piece set forming device 1 so as to be used for making a stator coil.

Figure 5A:
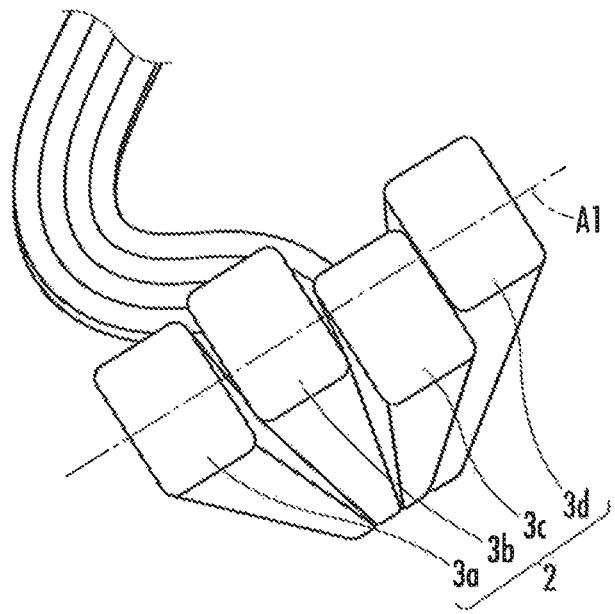
FIGS. 5A and 5B are diagrams illustrating an effect of the embodiment.
Figure 5B:
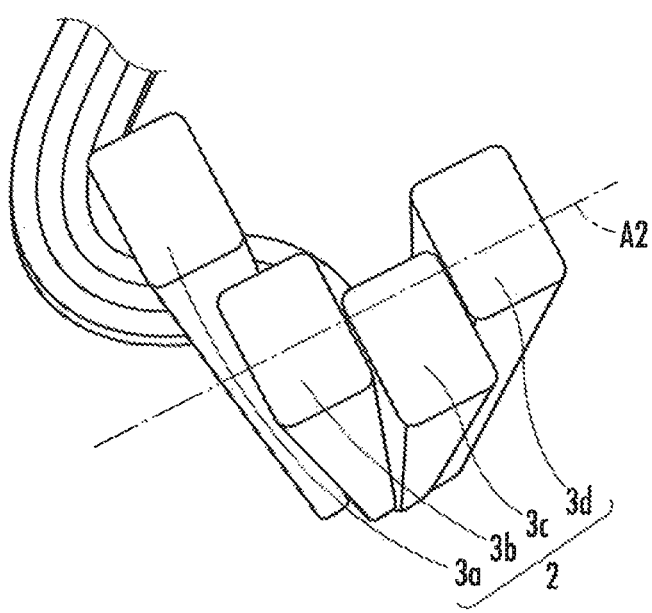

FIGS. 5A and 5B illustrate the effect of this embodiment. FIG. 5A illustrates a state of the ends of the respective conductive wire pieces 3 of the conductive wire piece set 2, which has been formed according to the embodiment, on the side where the twisting is performed in the second bent portion 18, viewed from the end face side.

FIG. 5B illustrates the similar state with respect to a comparative example of the embodiment. In this comparative example, the conductive wire piece set 2 is formed under the same conditions as this embodiment, except that an employed clamp portion restrains the conductive wire piece set 2 so that the conductive wire pieces 3 are parallel to each other without forming any angle.

In FIGS. 5A and 5B, the conductive wire piece set 2 includes the conductive wire pieces 3a, 3b, 3c, and 3d superposed on each other in this order from the center side of the curve in the second bent portion 18. In the comparative example of FIG. 5B, the position of the end face of the conductive wire piece 3a is considerably away from an average position A2 of the positions in the width direction of the end faces of the conductive wire pieces 3a to 3d.

Moreover, the position of the end face of the conductive wire piece 3c is away from the average position A2 in the reverse direction to the end face of the conductive wire piece 3a.

Specifically, the positions of the end faces of the conductive wire pieces 3a to 3d are considerably varied. In this case, a trouble occurs when the stator coil is made. In other words, a trouble occurs when the conductive wire piece set 2 is inserted into a slot of the stator core from the end face side. Moreover, the variation in the positions of the end faces causes a trouble in folding the conductive wire pieces 3 projecting from the slot of the stator core or in joining the ends or the like. This causes a need for a step of avoiding these inconveniences, which leads to an increase in cost.

Whereas, in the embodiment of FIG. 5A, the positions in the width direction of the respective end faces of the conductive wire pieces 3a to 3d are substantially aligned on the average position A1. Specifically, the positions of the ends of the conductive wire pieces 3a to 3d substantially coincide with each other in the width direction. Therefore, it is possible to prevent an occurrence of a trouble in making the stator coil.

The present invention is not limited to the above embodiment. For example, the number of conductive wire pieces constituting the conductive wire piece set 2 is not limited to four. For example, five conductive wire pieces may constitute the conductive wire piece set 2. Moreover, the restraint of the conductive wire piece set 2 with the clamp portion 24 does not always need to be performed in such a way that the inner conductive wire pieces 3 form a predetermined angle with the outer conductive wire pieces 3. The restraint may be performed in such a way that an angle varies with each conductive wire piece 3.

What is claimed is:

1. A conductive wire piece set forming method for forming a conductive wire piece set having a substantially U-shape including a predetermined number of conductive wire pieces superposed on each other in a thickness direction, each conductive wire piece having a rectangular cross section and having a predetermined length, width, and thickness, the method comprising:
a bending step of forming a first bent portion and a second bent portion which are bent in different directions at predetermined bent portions in the conductive wire piece set so that a center of curvature of the first bent portion and the second bent portion is located in a direction of superposing the conductive wire pieces of the conductive wire piece set;
a fixing step of fixing a portion of the conductive wire piece set bent in the bending step which is adjacent to the second bent portion on a first bent portion side of the conductive wire piece set bent in the bending step;
a restraining step of restraining a portion of the conductive wire piece set bent in the bending step which is adjacent to the second bent portion on an opposite side from the first bent portion side, and the second bent portion of the conductive wire piece set bent in the bending step, using a restraint tool; and
a twisting step of twisting the conductive wire piece set by rotating the restraint tool about a center axis line in a length direction in the portion of the conductive wire piece set bent in the bending step which is adjacent to the second bent portion on the first bent portion side of the conductive wire piece set bent in the bending step, using a rotary drive unit, after the fixing step and the restraining step, wherein
the restraint of the portion of the conductive wire piece set bent in the bending step which is adjacent to the second bent portion on the opposite side from the first bent portion side, and of the second bent portion of the conductive wire piece set bent in the bending step, with the restraint tool, is performed in such a way that each of the conductive wire pieces form a predetermined angle with each other so as to reduce variation in a position in a width direction of end portions of each of the conductive wire pieces of the conductive wire piece set after the twisting step.

2. The conductive wire piece set forming method according to claim 1, wherein, after the twisting step, the conductive wire pieces of the conductive wire piece set are bent back due to a springback effect in a direction that ends on a second bent portion side among the first bent portion and the second bent portion are aligned in the position in the width direction.

3. The conductive wire piece set forming method according to claim 1, wherein the restraint tool is provided with a restraining surface for restraining the conductive wire pieces with the angle formed therebetween so that the restraint of the conductive wire piece set is performed in such a way that the conductive wire pieces form the angle with each other.

4. A conductive wire piece set forming device which forms a conductive wire piece set having a substantially U-shape including a predetermined number of conductive wire pieces superposed on each other in a thickness direction, each conductive wire piece having a rectangular cross section and having a predetermined length, width, and thickness, the conductive wire piece set including a first bent portion and a second bent portion which are bent in different directions at predetermined bent portions in the conductive wire piece set so that a center of curvature of the first bent portion and the second bent portion is located in a direction of superposing the conductive wire pieces of the conductive wire piece set,
the device comprising:
a fixing jig for fixing a portion of the conductive wire piece set which is adjacent to the second bent portion on a first bent portion side of the conductive wire piece set;
a restraint tool for restraining a portion of the conductive wire piece set which is adjacent to the second bent portion on an opposite side from the first bent portion side of the conductive wire piece set, and the second bent portion of the conductive wire piece set; and
a rotary drive unit for twisting the conductive wire piece set by rotating the restraint tool about a center axis line in a length direction in the portion of the conductive wire piece set which is adjacent to the second bent portion on the first bent portion side of the conductive wire piece set restrained by the restraint tool, wherein
the restraint tool restrains the portion of the conductive wire piece set which is adjacent to the second bent portion on the opposite side from the first bent portion side, and the second bent portion of the conductive wire piece set, so that each of the conductive wire pieces form a predetermined angle with each other so as to reduce variation in a position in a width direction of end portions of each of the conductive wire pieces of the conductive wire piece set after the twisting with the rotary drive unit.

5. The conductive wire piece set forming method according to claim 1, wherein, in the bending step, the conductive wire piece set is formed to have a substantially S-shape bent portion including the first bent portion and the second bent portion at the predetermined bent portions with a center of curvature of the substantially S-shape bent portion being located in the direction of superposing the conductive wire pieces of the conductive wire piece set.

\* \* \* \* \*